United States Patent Office 3,276,821
Patented Oct. 4, 1966

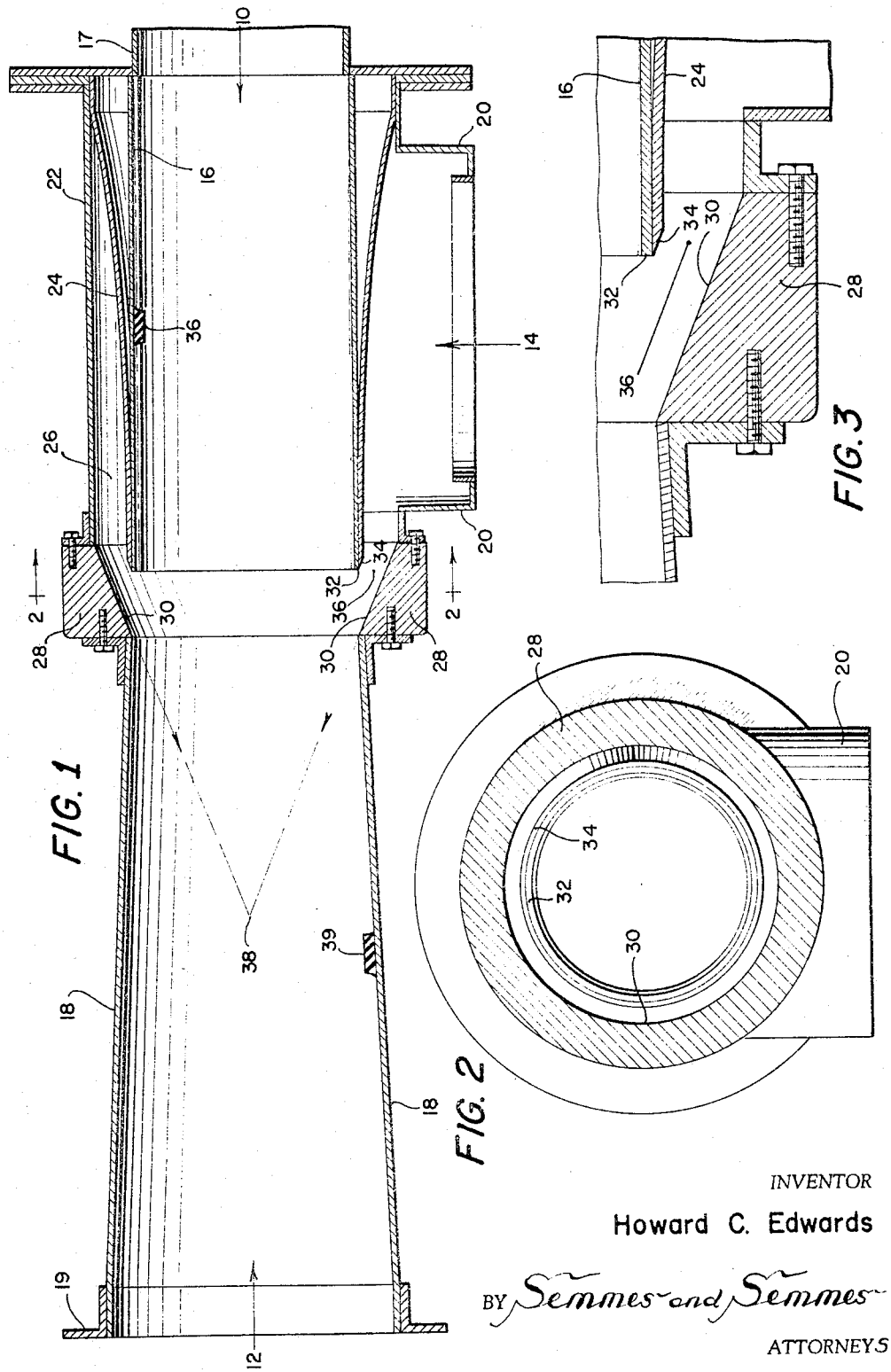

3,276,821
MATERIALS HANDLING DRAFT EDUCTOR
Howard C. Edwards, 2443 Whipple Road NW.,
Canton, Ohio
Filed Feb. 28, 1964, Ser. No. 348,024
5 Claims. (Cl. 302—25)

The present invention relates to materials handling eductors, and in particular, to an eductor for use in handling and diffusing comminuted materials, abrasives, sheet cuttings and the like and corrosive fumes.

In the processing of many compounds, such as uranium for example, many noxious and corrosive fumes are evolved. The necessity of rendering these fumes harmless before release to the atmosphere presents many problems. One such problem involves the ability to protect the materials handling equipment from corrosive action by the fumes. Similarly, to prevent the walls of tubular pneumatic materials handling conveyances from becoming corroded or worn as a result of the passage of abrasives, sheet cuttings and the like therethrough is a problem of long standing.

The present system is designed specifically to create a substantial negative pressure within the tubular conveyance so as to augment the action of the accompanying high pressure blower. In particular, the system is designed to produce a velocity of flow along the inside perimeter of the system that exceeds the velocity of flow along the center of the system so as to insure that the abrasive materials or fumes will not come in contact with the materials handling equipment, but rather, will travel along the center of the equipment.

The invention herein disclosed is believed to be an important improvement over both my Patent No. 2,722,372 and my pending application Serial No. 188,474, now Patent No. 3,152,839, October 13, 1964.

An object of the invention includes providing novel means for inducing a draft of high pressure air into tubular pneumatic materials handling conveyance systems whereby the components comprising the handling system may be maintained substantially free of wear and corrosive action resulting from the passage of fumes and abrasive materials therethrough.

Another object of the invention is to ensure that the materials passing through pneumatic conveyance systems will be confined to the center of the components of the system.

These and other objectives of invention will appear from reference to the ensuing specification and drawings in which:

FIGURE 1 is a vertical sectional view of the invention.

FIGURE 2 is a sectional view of the invention taken along line 2—2 of FIGURE 1.

FIGURE 3 is an enlargement of a portion of FIGURE 1 showing the wall structure forming the entrance of the high pressure air.

Referring now to FIGURE 1, the materials handling draft inducer assembly, designed for interposition in materials handling units which convey comminuted materials, pebbles, discrete granular materials or fumes, consists of an intake assembly 10, an exhaust assembly 12, and an artificial high pressure air input assembly 14.

The intake assembly 10 of the draft inducing assembly is defined by tube 16, which is slightly tapered so as to prevent materials moving therethrough from sticking to the sides thereof. Tube 16 is so designed that it may be interposed between different units of the materials handling equipment with the use of flange 17 which is connected to tube 16.

The high pressure air input assembly 14 is defined by tubular conduit 20 which intersects the cylindrical outer shell 22. A converging nozzle 24 is attached at one end thereof to cylindrical outer shell 22, and at the other end thereof to tube 16. As seen in FIGURE 1, the closed cylindrical outer shell 22 together with converging nozzle 24 defines a plenum chamber 26.

Exhaust outlet assembly 12 is defined by expansion tube 18 having a flange 19 attached at one end thereof providing means for securing the expansion tube 18 to an adjacent unit of the materials handling system. Attached to the other end of exhaust assembly 12 is a cast member 28 used to connect expansion tube 18 and cylindrical outer shell 22. As can be seen in FIGURE 3, the inner surface 30 of cast member 28 is parallel to the abutting edges 32 and 34 of tube 16, and converging nozzle 24 respectively.

Outlet from plenum chamber 26 is by way of slotted annulus 36 which is formed by the inner surface 30 of cast member 28, converging nozzle 24, and edge 32 of tube 16.

Finally, the interiors of the expansion tube 18 and tube 16 may be lined with resilient material 39 such as sponge rubber to protect same from abrasive contact with the materials being conveyed.

In operation, the introduction of high pressure air through slotted annulus 36 produces a velocity pattern which is substantially different from that in a normal venturi tube. The velocity pattern of a regular venturi is such that the air velocity is greatest at the center of the venturi tube. On the other hand, that velocity pattern produced by the introduction of high-pressure air through slotted annulus 36 is such that the air velocity is greatest at the outer periphery of expansion tube 18. This increase in velocity along the periphery of expansion tube 18 directs the corrosive fumes and/or abrasive materials toward the center of the expansion tube 18 and this "centering" effect is felt throughout the remainder of the exhaust system. Thus, the degree of corrosion and/or abrasion is greatly reduced.

By utilizing a tube 16 that is almost cylindrical in configuration, the air passing therethrough is prevented from increasing in velocity at the center of tube 16, such as would be the case if tube 16 converged as in the case of a conventional venturi tube. By utilizing an inlet tube that is approximately cylindrical, it is possible to avoid, then, the undesirable effects resulting from the necessity of using converging nozzle 24. Nozzle 24 must, of course, be curved to form a converging section is the proper pressure at the annulus 36 is to be achieved. As can be seen in FIGURE 1, the curvature of nozzle 24 together with the angle that surface 30 and edges 32 and 34 make to the axis of the eductor result in the creation of apex 38.

Various modifications are contemplated and may obviously be resorted to by those skilled in the art without departing from the spirit and scope of the invention, as hereinafter defined by the appended claims, as only a preferred embodiment thereof has been disclosed.

I claim:
1. A draft eductor for pneumatic conveyors of corrosive fumes and abrasive materials comprising:
   (A) a substantially cylindrical inlet tube having input and outlet ends, the materials and fumes flowing from said input end to said outlet end;
   (B) a high pressure air input assembly including a cylindrical outer shell surrounding said inlet tube;
   (C) a curvilinear converging nozzle having its largest end attached to said outer shell in sealing relationship therewith, and its smallest end joined to said outlet end of said inlet tube in sealing relationship therewith, the juncture of said nozzle and said inlet tube defining a surface sloping inwardly toward the cen- ter of said inlet tube and in the direction of movement of said corrosive fumes and abrasive material, said nozzle and said outer shell defining a plenum chamber;

(D) a tubular conduit intersecting and attached to said outer shell for conveying high pressure air to said plenum chamber;

(E) a diverging expansion tube for conducting said corrosive fumes and abrasive materials from said inlet tube; and (F) a connecting member attached at one end thereof to said expansion tube and at the other end thereof to said outer shell, said connecting member having an inner surface that is parallel to said surface defined by the juncture of said nozzle and said inlet tube, said inner surface and said surface defined by said juncture defining an annulus to conduct high pressure air from said plenum chamber to said expansion tube.

2. The draft eductor as described in claim 1 wherein said expansion tube and said inlet tube are lined with resilient material.

3. A draft eductor as in claim 1, in which said inlet tube is tapered slightly inwardly from said input end to said outlet end so as to prevent said corrosive fumes and abrasive materials passing through said inlet tube from sticking thereto.

4. A draft eductor as in claim 3, including a first flange attached to said inlet tube and a second flange attached to said expansion tube to provide means for interposing and mounting said draft eductor within said pneumatic conveyors.

5. A draft eductor as in claim 3, in which the width of said inlet tube is approximately the same as the length of said outer shell with which it intersects.

References Cited by the Examiner

UNITED STATES PATENTS

| 894,758 | 7/1908 | Starre | 302—25 |
| 1,152,302 | 8/1915 | Davenport | 302—25 |
| 2,722,372 | 11/1955 | Edwards | 302—25 |
| 3,175,515 | 3/1965 | Cheely | 302—25 |

FOREIGN PATENTS

| 660,427 | 5/1938 | Germany. |

EVON C. BLUNK, *Primary Examiner.*

ANDRES H. NIELSEN, SAMUEL F. COLEMAN,
*Examiners.*